United States Patent Office 3,496,059
Patented Feb. 17, 1970

3,496,059
LAMINATED ORIENTED FILM MATERIAL AND METHOD OF PRODUCING THE SAME
Ole-Bendt Rasmussen, Copenhagen, Denmark, assignor to Phillips Petroleum Company, a corporation of Delaware
Continuation of application Ser. No. 392,713, Aug. 28, 1964. This application Feb. 28, 1969, Ser. No. 806,001
Int. Cl. B32b 7/14, 31/12; C09j 5/02
U.S. Cl. 161—146                                7 Claims

ABSTRACT OF THE DISCLOSURE

Film laminates are made from at least two plies of an oriented film of a high polymer by bonding said plies together by a combination of spot-welding without substantial loss of the orientation in the spot-welded areas, and of a low-vicosity pressure-sensitive adhesive.

CROSS REFERENCE TO RELATED APPLICATION

This is a continuation of Ser. No. 392,713 filed Aug. 28, 1964, now abandoned.

The present invention relates to a laminated film material, and to a method of producing the same. More particularly, the invention relates to a laminate of films each consisting of orientable crystalline high polymers, the films being oriented and laminated together with the directions of orientation differing from ply to ply. Suitable polymers for making the films are, for instance, polymono-1-olefins such as polyethylene and crystalline polypropylene, superpolyamides, polyvinylidene chloride and polyethylene terephthalate.

The production of laminates as described above by using an adhesive for uniting the plies is known and leads to a material with a high tensile strength and a high tear propagation resistance when tearing does not proceed too quickly.

It has been suggested to unite the oriented plies by means of welding, as it was believed that the choice of laminating method was simply a matter of how to obtain the strongest bonding of the plies. When the plies were welded together, however, the tear resistance turned out to be relatively low.

That a laminate, in which adhesive is used, proves essentially superior to one which is welded, as far as tear propagation resistance is concerned, is due to the fact that in the former case the piles are able to slide over each other at the places were tearing is located. This allows for a characteristic flow of the polymer molecules to take place in each ply, by which the incision develops in different directions in the different plies. In each ply, the direction of orientation is changed at the same time by virtue of the tearing forces, resulting in an improvement of the strength of the ply in the direction of the force. If, however, the plies are firmly welded together, no slippage of the plies over each other can take place, and the material consequently behaves like a nonlaminated film when it is torn from an incision.

When making laminated, oriented film material, the adhesive is the normal commercial, pressure-sensitive type. Being normally applied in thin layers, these commercial adhesives provide for a sufficiently flexible connection between the plies, as long as the tear actions are relatively slow. In the case of sudden or shock-like ruptures, however, these adhesives are too viscous to allow for the necessary slippage between the plies. The bonds then behave similar to a weld and the tearing is not stopped.

For obtaining high tear propagation resistance even to shock-actions the plies must in fact be allowed to slide over each other more readily. This might be obtained by decreasing the viscosity of the adhesive, but it has been found that this is impractical because too little improvement is obtained in shock-resistance as the laminate readily splits up into single layers during normal use. It has also turned out that a certain interdependence of the plies in their way of working actually gives the best properties of strength in every respect.

It is an object of this invention to provide a laminate of oriented thermoplastic film, said laminate having a high resistance to tear propagation.

Another object is to provide a method of bonding together plies of a plastic laminate in order to improve the strength of the laminate when subjected to shock.

Other objects, advantages, and features of the invention will be apparent to those skilled in the art from the following description and drawing in which.

Figure 1:
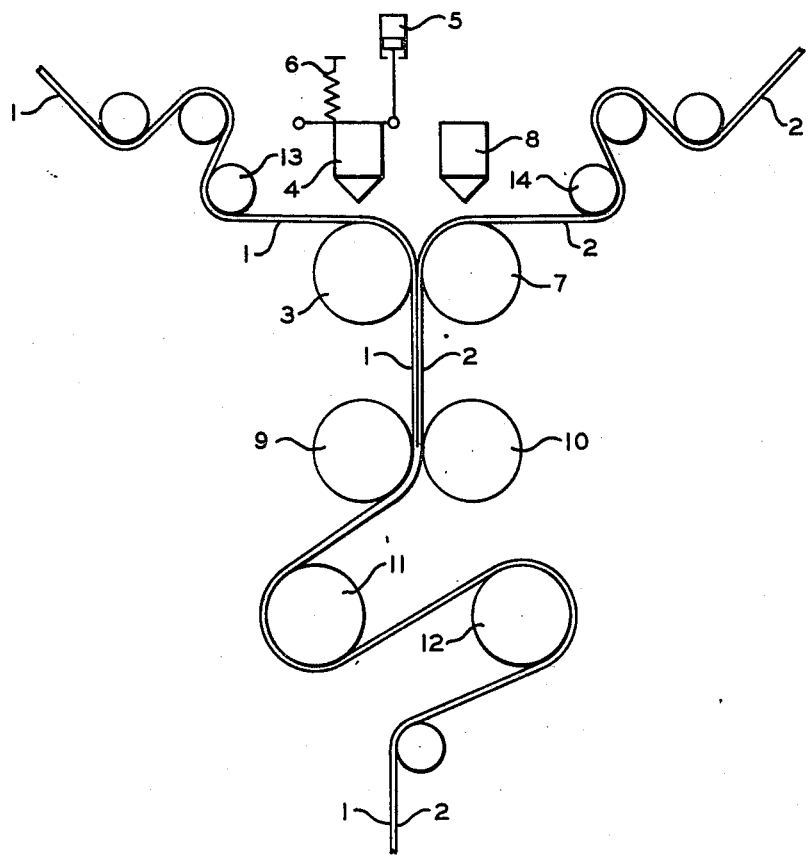
FIGURE 1 is a schematic diagram of the method of the invention.

According to this invention, an improved method for uniting the laminate and plies of the laminate is provided. It has now been found that spotwelding used in combination with a low-viscosity, pressure-sensitive adhesive for uniting the plies results in a laminate having a surprisingly high tear propagation resistance, even to shock-actions.

By the term "spot-welding" it is intended to cover forming any kind of discontinuous or spot-wise firm and direct connection between the plies, e.g. by heating and fusing, or by a mechanical action such as ultrasonic action, or by a chemical process, including the use of solvents or connecting by means of quickly polymerizing substances. The term is intended to cover shapes of the bonds other than actual spots, e.g. also stripes either running parallel or forming a pattern. The spot-wise connection is generally preferred, however, with spots having a diameter of 0.1–5 mm., the spacing between the spots being some 2–20 times their diameter.

The adhesives of the type employed in this invention are well known in the plastics laminating art. By low-viscosity it is meant that the adhesive in the bond has a high degree of plasticity according to the ASTM standard definition of this term (D–907–60, October 1962 Revision). The pressure-sensitive adhesive is preferably of the kind based upon natural or synthetic rubber, e.g. polyisobutylene being particularly suitable, or polymers of the acrylic or methacrylic group. To obtain a low viscosity, a relatively high amount of plasticizer should normally be added. Another suitable additive is microcrystalline wax which makes melting of the blend easier, and furthermore prevents cold-flow in the adhesive when only weak deforming forces are applied to the laminate.

The invention further comprises a method of producing the laminate, in which the sticking together, and the spot-welding is made in a single process, the adhesive being supplied in stripes or spots to the surface of one of the two films to be united to a laminate, after which the two films are joined together, welding taking place by applying pressure in the areas which are not covered by the adhesive, and finally, subjecting the laminate to a pressure, resulting in the adhesive being spread over such parts of the surfaces which are not united by welding.

The adhesive can be supplied through a trough-like nozzle extending over the width of the film and leaving openings in the bottom, through which the adhesive flows, forming longitudinal stripes on the advancing film surface. A spot-wise supply or a grid pattern can be carried out by a roller transfer in the manner known from the graphic trade. The film, which is thus coated with adhesive, is passed through a welding apparatus together with another film, a welding being carried out in places not covered by the adhesive. The process can be repeated with still one or more films, or be carried out simultaneously in respect of such further films.

In an appropriate embodiment of the present method, the welding is carried out, according to the invention, by supplying a solvent for the film material spot-wise in the places where the welding is to take place, and before the film is brought to bear against an adhesive-coated film, after which the welding is performed by applying pressure, substantially at such parts of the films which are not covered with adhesive.

The spot-wise supply of a solvent can take place through a nozzle as described hereinbefore, said nozzle swinging to and from the film surface, and the pressure can be applied by means of a patterned or ridged or rifled roller working against another roller having a resilient surface, e.g. a rubber covered roller.

According to the invention, the solvent is preferably supplied in a heated state, and can contain a thickening agent, preferably consisting of a small amount of the film material itself. In this manner a surface layer of the film is rapidly dissolved, and some evaporation of solvent takes place from the deposited spots, leaving sticky areas facilitating the welding in the subsequent application of pressure.

As mentioned above, however, the welding can also be brought about by means of locally applied spots of rapidly polymerizing compounds, which are made to polymerize, thus forming connections from ply to ply.

The adhesive is of course applied before welding takes place, but normally the surface areas to be welded must remain clean. The adhesive is, consequently, applied in a pattern either to one of or both surfaces to become united, and for this purpose a printing roller or other normal graphical means is suitable.

The spot-welding can take place with the use of a series of ultrasonic "hammers," well known in the art of sealing plastic films, each working against an "anvil," e.g. a roller. An essential point here is that ultrasonic welding does not decrease the orientation of stretched film if the intensity thereof and the cooling of the "hammers" are suitably adjusted.

In the following, another manner of carrying out the present invention will, however, be described in more detail having reference to the accompanying drawing, taking into account the simplicity of the apparatus involved.

Figure 2:
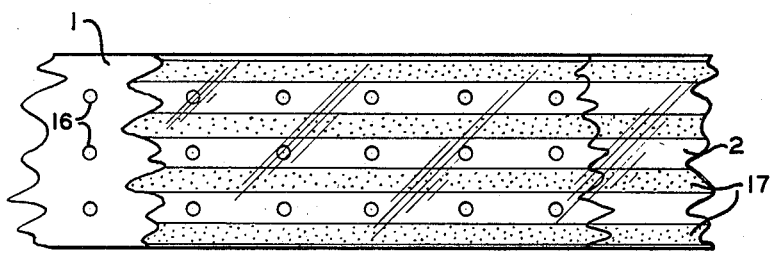
FIGURE 2 is a plan view of a laminate showing the pattern of bonds.

With reference to FIGURE 1, 1 and 2 are films made from a crystalline high polymer, e.g. polyethylene, which have been oriented by stretching in well known manner.

Film 1 follows a hard-rubber coated laminating roller 3. Above this roller there is disposed a vibrating casting-die 4 for applying a swelling agent, said die having in its wedge-formed bottom a series of fine extrusion nozzles that cover the whole width of the film. Vibration of the die is established by means of a pneumatic vibrator 5, the frequency being adjusted by variation of the tension of a spring 6.

From the casting-die 4, a solvent is applied spot-wise to the film. If the latter is made from polyethylene, hot xylene can be used containing a small amount of dissolved polyethylene serving as a thickening agent. The spot-wise application takes place by virtue of the vibrations, one droplet being deposited on the passing film from each nozzle every time the die "kisses" the said film.

Film 2 follows another laminating roller 7 of which the surface is smoothly waved. The waves correspond to the nozzles of die 4 in such a way that a laminating pressure is established only on those longitudinal stripes of the films which have received the droplets of solvent.

Above the roller 7 is a casting-die 8 for application of a low-viscosity pressure-sensitive adhesive. This is melted and flows out from a series of nozzles which are narrowly spaced in the wedge-formed bottom of the casting-die and cover the whole width of the film 2. During its passage under the die, the film will be coated with very narrow stripes of adhesive, and the dies 4 and 8 are adapted to each other in such a way that the stripes of adhesive are placed between the droplets of solvent when uniting of the films take place. Furthermore the size of the droplets, the temperatures, and the laminating pressure must be adapted to the velocity of the film in order to prevent the solvent from deeply penetrating into the films and destroying an important part of the orientation. The solvent should, preferably, be able to dissolve quickly just a relatively thin layer on the surface of each film.

By virtue of the wavy surface of the roller 7, the spot-welding takes place at a relatively high pressure and essentially without spreading the adhesive which was applied in narrow stripes. By means of a set of rollers 9 and 10 the adhesive stripes are, however, smeared out on all or nearly all the area where the plies have not already been united by the spot-welding.

Finally, the finished laminate passes a set of cooling rollers 11 and 12 before being wound on a bobbin. This cooling is suitable in order to obtain an intimate contact between the films and the solvent and adhesive, respectively, when the films are heated before lamination, as indicated by the heating elements 13 and 14.

A typical pattern of solvent spots and adhesive stripes is shown in FIGURE 2 which represents a plan view, partially in section, of a segment of the laminate as it enters between rolls 3 and 7. Here the solvent droplets 16 are being formed into spot-welds while pressure is not yet applied to adhesive stripes 17.

Figure 3:
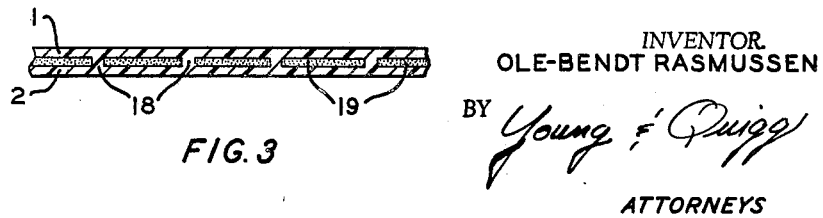
FIGURE 3 is a cross section of a laminate.

In FIGURE 3 a cross section of the finished laminate is shown to illustrate the relative positions of the welds and adhesive. Welds 18, shown in section, firmly unite films 1 and 2 which are also bonded together by the layer of adhesive 19.

The laminating method can easily be modified for use in simultaneously laminating three or more plies, as further disclosed in the following example.

Three films are used, each $20/\mu$ thick, consisting of high density polyethylene (d.=0.96), and being oriented by stretching at room temperature. The stretching ratio is 4:1, and the direction of orientation in each ply forms angles of 60° to those of the two other plies. For the adhesion, polyisobutylvinyl ether of a molecular weight of about 60,000 is used, to which is further added a plasticizer consisting of polyisobutylene of a relatively low molecular weight, e.g. about 3000, and a microcrystalline wax, the blending ratios being 3:1:1, respectively. The purpose of adding the wax is to prevent cold-flow in the adhesive when it is subjected to small shear-tensions only.

For the spot-welding xylene is used, in which 2% polyethylene is dissolved. The latter serves as a thickening agent, and the solution is applied at a temperature of 120° C.

The droplets which form a circular weld about 1 mm. in diameter are deposited with a spacing of 1 cm. center to center. The adhesive is applied in the space between the droplets in stripes 0.5 mm. wide, the mutual distance of the stripes being 2.5 mm., as measured from center to center of each stripe. About 5 grams of adhesive is applied per square meter.

Instead of using a solvent for carrying out the spot-welding, a series of flames or any other high intensity heat source can be brought close to or in contact with each of the surfaces to be united immediately before lamination. This treatment can take place when both plies are lying on the laminating rollers, and it is essential that melting take place only within a relatively thin layer in each of the plies. This method is advantageous when high laminating speeds are not needed. Also many different dimensions and spacings of the welds and adhesive are possible by varying the pattern. For example applying the adhesive in a grid pattern all around the spot welds permits a wider spacing of the adhesive stripes.

Finally, spot-welding without destruction of orientation can be carried out with the use of readily polymerizing substances, e.g. α-cyanomethyl acrylate or vinylidene dicyanide. These can be applied to one of the plies by means of a printing roller, and the adhesive can be applied to the other ply by means of another printing roller. Polymerization can take place when the laminate has been wound on a bobbin and is being stored, or the laminate can alternatively pass through a storage zone before being wound up.

As it will be evident to those skilled in the art various modifications can be made in our invention without departing from the spirit and scope thereof.

I claim:

1. A laminated film material having at least 2 plies of film made from orientable high polymer, each ply being oriented principally in one direction and the plies being laminated with the principal directions of orientation differing among the plies, said plies being bonded together by a combination of spot-welding without substantial loss of the orientation in the spot-welded areas, and of a low-viscosity pressure-sensitive adhesive, the aggregate of the spot-welded areas and the pressure-sensitive adhesively bonded areas being substantially equal to the area of the laminated material.

2. A laminated film as in claim 1 wherein said polymer is a thermoplastic, crystalline high polymer.

3. The laminate of claim 2 having three plies of film formed from polymono-1-olefin.

4. A method of making a multi-ply laminate of films of orientable high polymer as in claim 1, each film being oriented in one principal direction, which comprises the steps of assembling a plurality of plies of said film with the principal directions of orientation differing among the plies, spot-welding said plies together without substantial loss of the orientation in the spot-welded areas, and bonding said plies together by means of a low viscosity, pressure-sensitive adhesive substantially throughout the areas not spot-welded together.

5. The method of claim 4 wherein said adhesive is applied in a discontinuous coating to at least one of the faces of each ply before the plies are assembled and the areas of the assembled plies free of adhesive are spot-welded together.

6. The method of claim 4 wherein said adhesive is applied to a face of each ply in a discontinuous coating, the plies are assembled with the adhesive therebetween and spot-welded in the areas not covered by adhesive, and pressure is applied to the assembly to spread the adhesive substantially coextensively with the areas not spot-welded.

7. The method of claim 4 wherein said spot-welds are formed by applying localized spots of a rapidly polymerizing compound which polymerizes to form connection between the plies.

References Cited

UNITED STATES PATENTS

| | | | |
|---|---|---|---|
| 2,354,714 | 8/1944 | Strickland | 156—73 |
| 2,633,894 | 4/1953 | Carwile | 156—73 |
| 2,956,723 | 10/1960 | Tritsch. | |
| 3,017,302 | 1/1962 | Hultkrans | 161—402 X |
| 3,130,647 | 4/1964 | Anderson et al. | 156—290 |
| 3,322,613 | 5/1967 | Rasmussen | 161—402 |

ROBERT F. BURNETT, Primary Examiner

RAYMOND O. LINKER, JR., Assistant Examiner

U.S. Cl. X.R.

156—73, 290, 295, 307; 161—402